United States Patent [19]

Huang et al.

[11] Patent Number: 5,937,381
[45] Date of Patent: Aug. 10, 1999

[54] SYSTEM FOR VOICE VERIFICATION OF TELEPHONE TRANSACTIONS

[75] Inventors: William Yee-Ming Huang; Lawrence George Bahler; Alan Lawrence Higgins, all of San Diego, Calif.

[73] Assignee: ITT Defense, Inc., McLean, Va.

[21] Appl. No.: 08/632,723

[22] Filed: Apr. 10, 1996

[51] Int. Cl.[6] .................................................. G10L 5/06
[52] U.S. Cl. ..................... 704/247; 704/214; 704/246; 704/247; 704/251
[58] Field of Search ................................. 395/2.55–2.59, 395/2.65, 2.82, 2.52; 704/246–250, 256, 273, 252

[56] References Cited

U.S. PATENT DOCUMENTS

| | | | |
|---|---|---|---|
| 5,159,638 | 10/1992 | Naito et al. | 704/213 |
| 5,167,004 | 11/1992 | Netsch et al. | 395/2 |
| 5,216,720 | 6/1993 | Naik et al. | 395/2 |
| 5,271,088 | 12/1993 | Bahler | 395/2 |
| 5,295,223 | 3/1994 | Saito | 704/214 |
| 5,297,194 | 3/1994 | Hunt et al. | 379/88 |
| 5,339,385 | 8/1994 | Higgins | 395/2.55 |
| 5,341,456 | 8/1994 | DeJaco | 704/214 |
| 5,390,278 | 2/1995 | Gupta et al. | 395/2.52 |
| 5,414,755 | 5/1995 | Bahler et al. | 379/67 |
| 5,430,827 | 7/1995 | Rissanen | 395/2.82 |
| 5,450,524 | 9/1995 | Rissanen | 395/2.54 |
| 5,459,814 | 10/1995 | Gupta et al. | 704/233 |
| 5,465,290 | 11/1995 | Hampton et al. | 379/67 |
| 5,499,288 | 3/1996 | Hunt et al. | 379/88 |
| 5,649,055 | 7/1997 | Gupta et al. | 704/233 |
| 5,765,127 | 6/1998 | Nishiguchi et al. | 704/208 |
| 5,774,849 | 6/1998 | Benyassine et al. | 704/246 |
| 5,809,455 | 9/1998 | Nishiguchi et al. | 704/214 |

Primary Examiner—David R. Hudspeth
Assistant Examiner—Michael N. Opsasnick
Attorney, Agent, or Firm—Arthur L. Plevy; Saul Elbaum

[57] ABSTRACT

A system and a method is disclosed for verifying a voice of a user conducting a telephone transaction. The system and method includes a mechanism for prompting the user to speak in a limited vocabulary. A feature extractor converts the limited vocabulary into a plurality of speech frames. A pre-processor is coupled to the feature extractor for processing the plurality of speech frames to produce a plurality of processed frames. The processing includes frame selection, which eliminates each of the plurality of speech frames having an absence of words. A Viterbi decoder is also coupled to said feature extractor for assigning a frame label to each of the plurality of speech frames to produce a plurality of frame labels. The processed frames and frame labels are then combined to produce a voice model, which includes each of the plurality of frame labels that correspond to the number of plurality of processed frames. A mechanism is also provided for comparing the voice model with the claimant's voice model, derived during a previous enrollment session. The voice model also is compared with an alternate voice model set, derived during previous enrollment sessions. The identity claimed is accepted if the voice model matches the claimant's voice model better than the alternative voice model set.

21 Claims, 2 Drawing Sheets

SYSTEM FOR VOICE VERIFICATION OF TELEPHONE TRANSACTIONS

RELATED APPLICATIONS

The Assignee herein, ITT Corporation, is the record owner of copending U.S. application Ser. No. 08/510,321 to Naylor et al., entitled SPEAKER INDEPENDENT COMMAND RECOGNITION SYSTEM AND METHOD, filed Aug. 2, 1995.

BACKGROUND OF THE INVENTION

1. Field of the Invention

The present invention relates generally to voice verification and more particularly, to a voice verification system that verifies the identity of an individual based on voice samples collected during a telephone conversation.

2. Description of the Prior Art

Voice verification is needed in a variety of systems such as home banking, home inceration, remote database access, ticketless air travel etc. A common requirement of these systems is the need to verify an authorized user's identity who is trying to conduct a transaction at a remote location. Such a requirement is necessary in order to prevent an unauthorized user from gaining access who potentially can cause damage. The danger of an unauthorized user gaining access is especially high in today's computer literate society.

Other types of identification methods have proved to be limited or ineffective in such systems. For example, the use of passwords is limited by the fact that passwords may be forgotten, stolen or voluntarily given to another person. Other methods such as fingerprints, retinal scans etc. are inappropriate for remote transactions because the physical presence of the user to be identified is required. In contrast, voice verification systems provide a means to identify a potential user located anywhere within a telephone network.

Voice verification systems generally operate by comparing speech spoken by a potential user to previously stored speech containing corresponding words in order to identify the user. Usually the previously stored speech is entered into the system by an enrollment function. In a number of systems, the comparison between the spoken and stored speech is based on a measurement of the nearest neighbor distance between corresponding elements. This measurement is usually performed by computer processing of such elements converted into digital form.

An example of a voice verification system is exemplified by U.S. Pat. No. 5,339,385 to Higgins, entitled SPEAKER VERIFIER USING NEAREST NEIGHBOR DISTANCE MEASURE, issued on Aug. 16, 1994. Higgins discloses a system that includes a verification module that computes the nearest neighbor distance between a test session and an enrollment session. Higgins further discloses the verification module computing the nearest neighbor distances between the test session and a plurality of additional enrollment sessions from a group of reference speakers. The additional nearest neighbor distances are computed in order to minimize the probability of false acceptance.

Other examples of voice verification systems are exemplified by U.S. Pat. No. 5,271,088 to Bahler, entitled AUTOMATED SORTING OF VOICE MESSAGE THROUGH SPEAKER SPOTTING, issued on Dec. 14 1993 and U.S. application Ser. No. 08/510,321 to Naylor et al. Bahler discloses a system incorporating pre-processing techniques such as feature extraction and blind de-convolution, while Naylor et al discloses a system including a word recognizer utilizing Hidden Markov Modeling and a Viterbi Decoder.

Existing voice verification systems have a number of limitations. One limitation relates to the length of time required to enroll or verify a user into these systems. Very often the length of time is to long, which makes the use of these systems inconvenient or unacceptable to many users. Another limitation relates to the accuracy of the existing systems. The accuracy often is poor, due to the use of different phonesets for verification and enrollment.

Therefore, it as an object of the present invention to provide a voice verification system that reduces the amount of time required for the enrollment and verification.

Therefore, it as a further object of the present invention to provide a voice verification system that is accurate even though different phonesets are used for verification and enrollment.

SUMMARY OF THE INVENTION

A system and a method is disclosed for verifying a voice of a user prior to conducting a telephone transaction. The system and method includes a means for prompting the user to speak in a limited vocabulary. A feature extractor converts the sampled speech signal to a plurality of speech frames. A pre-processor is coupled to the feature extractor for processing the plurality of speech frames to produce a plurality of processed frames. The processing includes frame selection, which eliminates each of the plurality of speech frames having an absence of words.

A Viterbi decoder is coupled to the feature extractor for assigning a label to each of the plurality of speech frames to produce a plurality of frame labels. The plurality of processed frames, combined with the associated frame labels constitutes a voice model. The voice model includes each of the plurality of frame labels that correspond to the number of the plurality of processed frames.

The system and method further includes means for measuring a nearest neighbor distance between the voice model produced from speech of an unknown person and a user voice model produced from an enrollment speech of an enrolled user. The nearest neighbor distance is calculated by only comparing the individual frames of the voice model and the claimant voice model that have the same label. A means is also included for accepting or rejecting the claimed identity based on a comparison of the voice model to the claimant's voice model, and a comparison of the voice model to a plurality of alternative voice models. The identity is accepted if the voice model matches the claimant's model better than the alternative models.

BRIEF DESCRIPTION OF THE DRAWINGS

The above objects, further features and advantages of the present invention are described in detail below in conjunction with the drawings, of which.

DETAILED DESCRIPTION OF THE DRAWINGS

Figure 1:
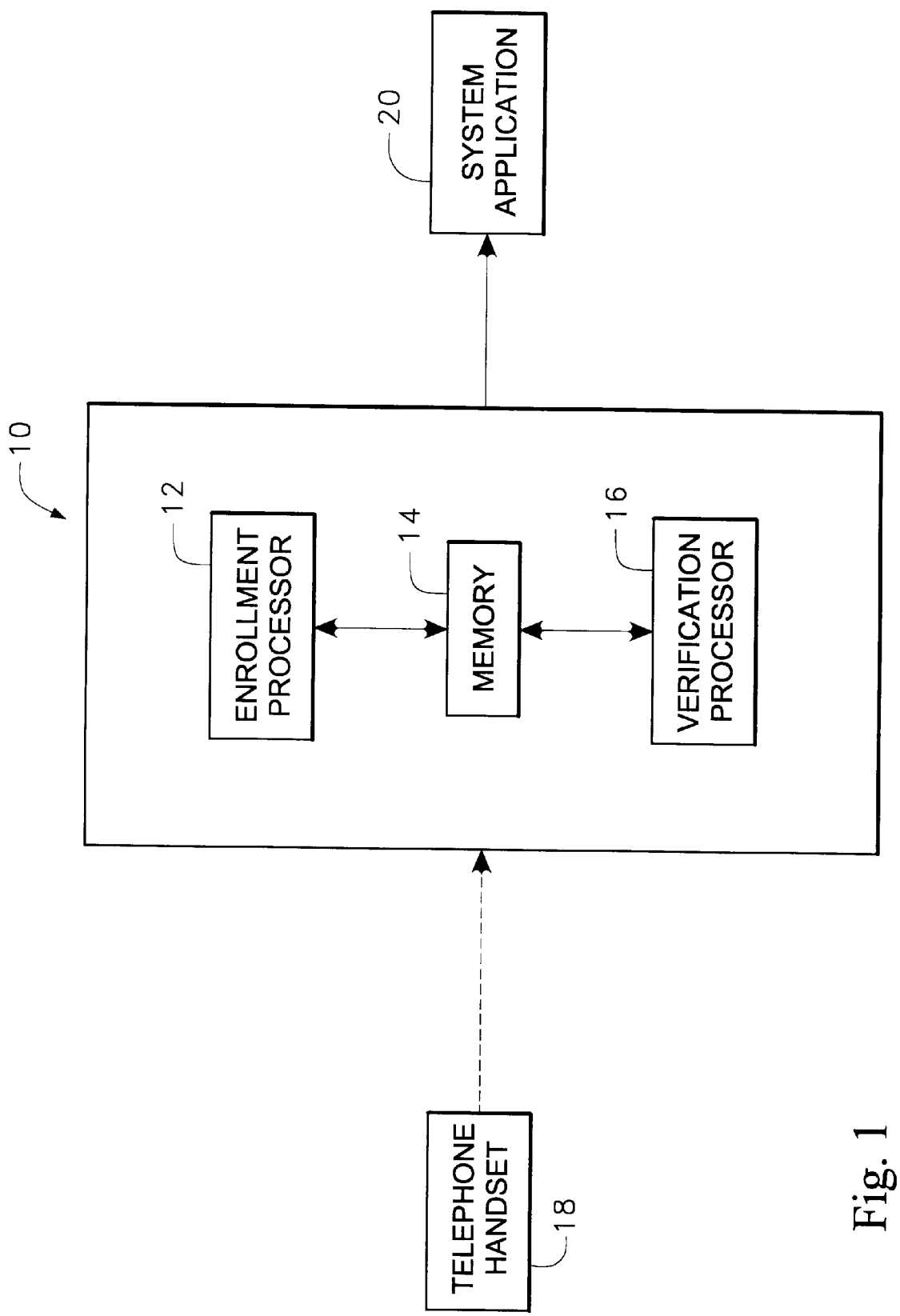
FIG. 1 is a block diagram of the voice verification system according to the present invention.

Referring to FIG. 1, there is shown a block diagram of the voice verification system according to the present invention.

The voice verification system 10 is coupled between a telephone handset 18 located usually at a remote location and a system application 20. The system 10 is operable to either deny or grant access to a potential user requesting access to the system application 20 via the telephone handset 18. The system 10 will deny or grant access by verifying if the potential user is enrolled into the system 10, which means such a user is an authorized one.

The system 10 which includes an enrollment processor 12, a memory 14 and a verification processor 16 is preferably implemented on a programmable computer. The enrollment processor 12 performs the enrollment function by generating a voice model of an authorized user's speech. The voice model generated by the enrollment processor 12 is then stored in the memory 14. The voice model is capable of being downloaded at a later time by the verification processor 16 in order to perform the verification function. The verification processor 16 performs the verification function by first processing the speech of the user and then comparing the processed speech to the voice model. Based on this comparison, the verification processor 16 either denies or grants access to the user.

Figure 2:
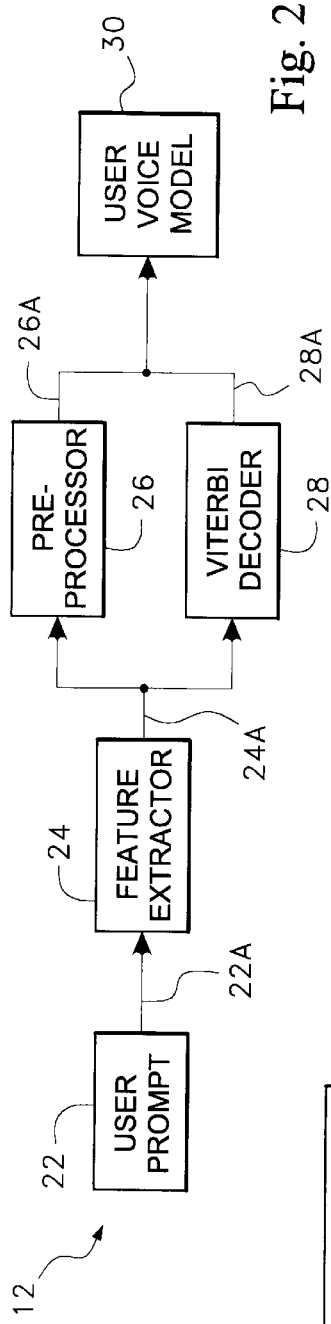
FIG. 2 is a block diagram of the enrollment processor according to the present invention.
Figure 3:
FIG. 3 is a chart of the enrollment phrases according to the present invention.

Referring to FIG. 2, a block diagram of the enrollment processor according to the present invention is shown. The enrollment processor 12 includes a user prompt 22 which generates a synthesized or pre-recorded voice for interfacing with users. The synthesized or pre-recorded voice prompts a user to speak into the processor 12, thereby producing enrollment speech 22A. The enrollment speech 22A is limited to one or more phrases selected from the group of enrollment phrases shown in FIG. 3.

The enrollment phrases are limited to the 24 combinations of the words 4,6,7 & 9 arranged in a double two-digit number combination. Phrases containing the words 0,1,2,3,5 and 8 are excluded because such numbers introduce pronunciations that depend on the position of the word within the phrase, for example 20 versus 2. The 24 enrollment phrases were selected because such phrases are easy to repeat consistently and minimize the number of phrases required for enrollment and verification. These 24 phrases were also selected because the small number of words enable accurate word recognition accuracy and the phonetic composition structure of these phrases enables channel equalization by a blind deconvolution method.

Referring back to FIG. 2, the enrollment speech 22A is coupled to a feature extractor 24, which converts the enrollment speech 22A into a set of spectral features known as speech frames 24A. The present invention encompasses a number of different well known methods for feature extraction. However, a preferred method is disclosed in U.S. Pat. No. 5,271,088 to Bahler, the disclosure of which is incorporated herein by reference.

The speech frames 24A are coupled to a pre-processor 26 for further processing, which generates processed frames of speech 26A. The further processing includes frame selection and channel equalization.

Frame selection utilizes a number of criteria in order to eliminate a number of the speech frames 24A. A histogram of power is formed from the speech frames 24A. A nominal interval of acceptable energies is established as the range from the tenth percentile value plus six dB to the 97th percentile minus three dB. If this nominal range is six dB wide or wider, only the remaining speech frames 24A within this range is utilized. Otherwise, the passing range is widened to 6 dB symmetrically about the center of the nominal passing energy range. This guarantees that the processed frames 26A have at least six dB of dynamic range and eliminates regions of probable degradation due to extreme clipping and/or noise. Speech frames 24A that do not contain words such as those that correspond to silence between words are eliminated by this procedure.

Channel equalization further processes the frames of speech 24A in order to eliminate the inaccuracies due to channel affects. Channel affects are introduced when a different telephone handset is utilized in the enrollment and verification functions. Channel equalization is accomplished by a technique known as blind deconvolution, which filters the remaining frames of speech 24A in such a way to equalize the long-term power spectrum at all frequencies in the telephone band. A preferred type of blind deconvolution filter includes deconvolving the spectral data of the frames of speech 24A into a flat long-term power spectrum. This is accomplished by first multiplying the values of a plurality of filter banks by a value chosen to make the mean over the selected frames 24A equal to a constant. Then, the filter bank values are re-normalized by a norm disclosed in U.S. Pat. No. 5,271,088 to Bahler.

The particular deconvolution filter utilized depends on both the frequency response of the channel and the power spectrum of the enrollment speech 22A. Consider a composite channel that includes both the real channel and the blind deconvolution channel. If two utterances with the same power spectrum are passed through different channels and then blind deconvolved, the composite channel is identical. Thus, this enables individual frames from the two utterances to be compared without regard for channel differences.

Blind deconvolution is limited to applications that assume that all of the speech analyzed has the same long term power spectrum. This assumption is not valid in general for short utterances containing different words. This problem is the reason that prior voice verification systems have not utilized blind deconvolution. In contrast, the voice verification of the present invention is able to utilize blind deconvolution because every prompted phrase contains the same words.

The speech frames 24A are also coupled to a Viterbi decoder 28 in order to generate frame labels 28A. The Viterbi decoder 28 incorporates speaker independent Hidden Markov Models (HMMs) corresponding to each of the vocabulary words.

HMMs in general are probabilistic models describing the time varying characteristics of speech patterns. A HMM generally includes a sequence of nodes or states which represent the different portions of a particular word. The use of HMMs for word recognition is well known and discussed in such articles written by S. E. Levinson et al., entitled an INTRODUCTION TO THE APPLICATION OF THE THEORY OF PROBABILISTIC FUNCTIONS OF A MARKOV PROCESS TO AUTOMATIC SPEECH RECOGNITION, Pg. 1035–1074, B.S.T.G., 62(4) and by S. Nakagawa, entitled SPEECH RECOGNITION BY PROBABILITY MODELS, Pg. 33–40, Society of Electronic Information Communication.

HMMs must be trained in order to perform a complex task such as voice verification. Such training methods are well known and are available on the market as software kits. An example of such a software kit is the software toolkit HTK version 1.4, which is available from Eutropic Research Laboratory, Inc., 600 Pennsylvania Avenue, S.E. Suite 202, Washington, D.C. 20003. Basically, this software kit includes a plurality of training modules which interface externally via a plurality of library modules to train HMMs.

The library modules read in pre-developed HMM definition data to produce new estimates of its parameters using a labeled speech data file and then write out a revised definition.

A Viterbi Decoder is utilized to perform speech recognition functions usually in conjunction with HMMs. Viterbi Decoders are well known in the field of speech recognition.

In the present invention, the Viterbi decoder 28 accesses the HMM model that corresponds to the phrases in the speech frames 24A. The Viterbi Decoder is then utilized to perform recognition on the speech frames 24A in conjunction with the HMM model. The recognition process involves assigning a label to each of the frames of speech 24A, thereby generating the frame labels 28A.

The Viterbi Decoder of the present invention differs from what is disclosed in U.S. application Ser. No. 08/510,321 to Naylor et al. by further generating a frame label 28A for each of the frames of speech 24A. Each frame label 28A identifies the most probable node of the HMM model associated with that frame.

The processed frames 26A and frame labels 28A are then combined to form a voice model 30. The voice model 30 includes only the frame labels 28A that correspond to the reduced number of the processed frames 26A. Generating a voice model in the above manner is a significant improvement over the prior art, which does not associate a frame label with every processed frame.

The voice model 30 produced by the enrollment processor 12 represents the voice of an enrolled user. It can be utilized as either a claimant's voice model or as an alternative voice model by the verification processor, described next.

Figure 4:
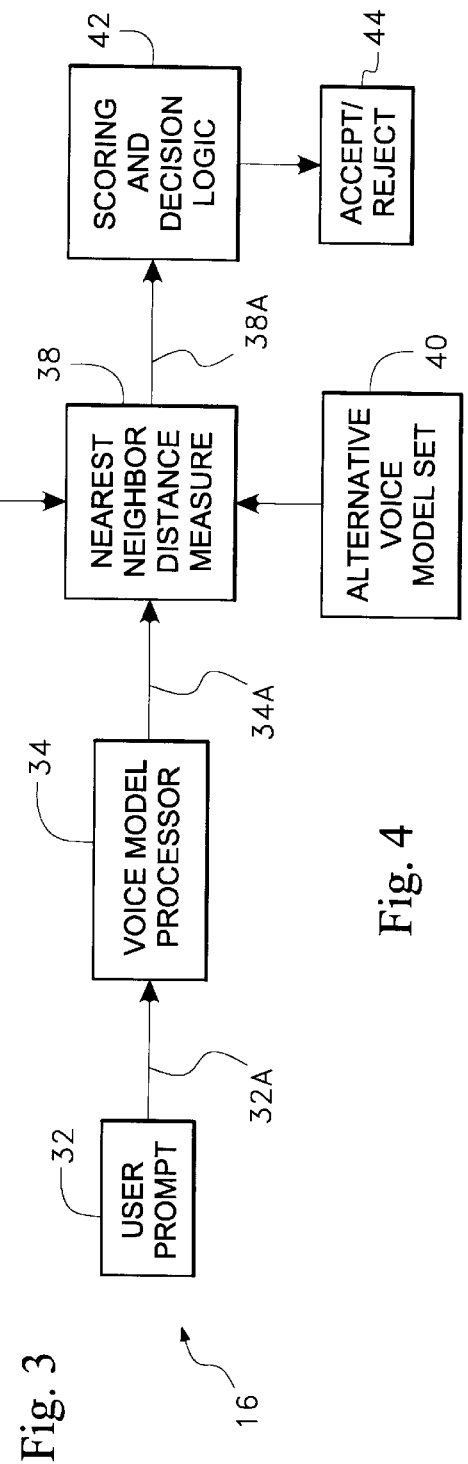
FIG. 4 is a block diagram of the verification processor according to the present invention.

Referring to FIG. 4, there is shown a block diagram of the verification processor according to the present invention. The verification processor 16 also includes a user prompt 32. The user prompt 32 interfaces with a user trying to gain access to a system application. The user prompt 32 first prompts the user for a claimed identity, which enables the verification processor 16 to download a corresponding claimant voice model 36 which is utilized to verify the identity of the user. The user prompt 32 then prompts the user for verification speech 32A, which includes phrases selected randomly from the set of phrases of FIG. 3.

Still referring to FIG. 4, the verification speech 32A is coupled to a voice processor 34. The voice processor 34 includes a feature extractor, a pre-processor and a Viterbi decoder, which are configured and function substantially the same as described with respect to the enrollment processor 12 of FIG. 2. Still referring to FIG. 4, the voice model processor 34 generates a voice model 34A of the user requesting access. The voice model 34A is generated and has substantially the same configuration as the voice model 30 described with respect to FIG. 2. The voice model 34A being generated by such a parallel configuration similarly increases the speed of the verification processor 16.

Still referring to FIG. 4, the voice model 34A is coupled to a nearest neighbor distance measure 38, which compares the frames of the voice model 34A to the frames of the claimant's voice model 36. For this comparison, a distance measure 38A is generated which is a numerical representation of how close the voice model 34A is to the claimant's voice model 36. As previously discussed the claimant's voice model 36 is the model that corresponds to the claimed identity of the user requesting access.

The nearest neighbor distance measure 38 generates the distance measures 38A by calculating nearest neighbor distances ($d_{T,E}$) by:

$$d_{T,E} = \frac{1}{N} \sum_{j=1}^{N} \min_{l(e_i)=l(t_j)} (|t_j - e_i|^2) \quad (1)$$

where $t_j$ is the jth frame of the voice model 34A, $e_i$ is the ith frame of the user's voice model 36, $l(e_i)$ is the frame label associated with $e_i$ and $l(t_j)$ is the frame label associated with $t_j$. The frame to frame differences ($|t_j - e_i|^2$) are computed for all pairs of frames $t_j$ and $e_j$ having the same frame label, where j ranges over all the frames of the voice model 34A and i ranges over all the frames of the claimant's voice model 36.

In equation (1), the distances calculated are only between the frames of the voice model 34A and the claimant's voice model 36 that correspond to the same region of the same word. The present invention determines which frames correspond to the same region of the same word by the labels assigned by the Viterbi decoder, which is included in both the enrollment processor of FIG. 2 and the verification processor of FIG. 4. Thus, the nearest neighbor distance calculation only compares frames of the voice model 34A and the frames of the claimant's voice model 36 that have the same labels. This is an improvement over the prior art, which determines the corresponding frames by a complicated method of assigning indexes based on the position of the frames with respect to the word as described in U.S. Pat. No. 5,339,385 to Higgins.

The distance measure 38A is coupled to scoring and decision logic 42, which utilizes the distance measure 38A in order to determine whether to reject or accept the user requesting access. This is accomplished by comparing the distance measure 38A with a predetermined threshold value. If the distance measure 38A exceeds the threshold, the scoring and decision logic 42 generates a reject signal 44 denying access to the user. If the distance measure 38A is within or less than the threshold, the scoring and decision logic 42 generates an accept signal 44 granting access to the user. The predetermined threshold value preferably is a value that can be adjusted for the desired tradeoff between false acceptance and false rejection error rates.

Still Referring to FIG. 4, in a preferred embodiment of the present invention the voice model 34A is compared to an alternate voice model set 40 in addition to being compared to the claimant's voice model 36. The alternate voice model set 40 includes voice models from a group of speakers other than the claimant. For each of the above comparisons, a nearest neighbor distance 38A will be generated utilizing equation (1) as previously discussed. Thus, by utilizing equation (1) a plurality of nearest neighbor distances 38A are generated by the nearest neighbor distance measure 38.

In the present invention, there is only one alternate voice model set 40 utilized for any enrolled user requesting access. This is an improvement over the prior art which generates a different voice model set for each different enrolled user as described in U.S. Pat. No. 5,339,385 to Higgins. Utilizing a single alternate voice model set eliminates false alarm rates that vary dramatically among users, which is particularly a problem in telephone applications. Also, the complexity of the voice verification system of the present invention is reduced by maintaining a single alternate voice model set 40.

The alternate voice model set 40 of the present invention is generated by first producing voice models for a large number of users preferably a hundred or more, ordered arbitrarily, wherein the voice models are preferably generated utilizing the enrollment processor 12 of FIG. 2. Referring back to FIG. 4, the alternate voice model set 40 is then initially configured to contain a first voice model. Then a second voice model is compared to the first by measuring the nearest neighbor distance between both, wherein the method for calculating the nearest neighbor distance will be described later. If the nearest neighbor distance exceeds a predetermined threshold, the second voice model is added to the alternate voice model set 40, otherwise it is not added. Each voice model thereafter considered is compared with all of the models in the alternate voice model set 40 and is only added if all the nearest neighbor distances exceed the predetermined threshold.

In the preferred embodiment of the present invention, the distance measures 38A are also coupled to scoring and decision logic 42, which utilizes the distance measures 38A in order to determine whether to reject or accept the user requesting access. In making this decision the scoring and decision logic 42 first calculates an approximate likelihood ratio, which is the ratio of the likelihood of the observed speech being produced by the user to it being produced by anyone else. The likelihood ratio approximation ($D_{T,C}$) is calculated by:

$$D_{T,C} = \min_{0 \leq i < S(C)}(d_{T,ci}) - \min_{0 \leq j < M}\left\{\min_{0 \leq k < S(j)}(d_{T,rjk})\right\} \quad (2)$$

wherein C is claimed speaker or user requesting access, S(C) is the number of enrollment sessions of C, $C_i$ is the claimed speaker's ith enrollment session, S(j) is the number of enrollment sessions of referenced speaker j and rjk is referenced speaker j's kth enrollment session.

The likelihood ratio ($D_{T,C}$) is then also compared with a predetermined threshold value in order to verify the identity of the user as previously discussed. If the likelihood ratio ($D_{T,C}$) exceeds the threshold, the scoring and decision logic 42 generates a reject signal 44 otherwise it generates an accept signal.

While the invention has been particularly shown and described with reference to preferred embodiments thereof, it will be understood by those skilled in the art that changes in form and details may be made therein without departing from the spirit and scope of the present invention.

What is claimed is:

1. A system for verifying a voice of a user conducting a telephone transaction, comprising:
    a means for prompting said user to speak in a limited vocabulary;
    a feature extractor coupled to said limited vocabulary for converting said limited vocabulary into a plurality of speech frames;
    a pre-processor coupled to said feature extractor for processing said plurality of speech frames to produce a plurality of processed frames, said processing including frame selection means for selecting those frames having power levels falling within a nominal range of acceptable energies, which eliminates each of said plurality of speech frames which are below or exceed said nominal range, including those frames having an absence of words;
    A Viterbi decoder coupled to said feature extractor for assigning a frame label to each of said plurality of speech frames producing a plurality of frame labels; and
    a means for combining said plurality of processed frames with said plurality of frame labels to produce a voice model including each of the plurality of frame labels that correspond to the number of said plurality of processed frames.

2. The system of claim 1, wherein said limited vocabulary includes at least one enrollment phrase selected from the group of 24 combinations of the words 4,6,7 & 9 arranged in a double two-digit number combination.

3. The system of claim 1, wherein said model is a HMM model including a plurality of nodes.

4. The system of claim 1, wherein said processing further includes channel equalization of said plurality of speech frames by a blind deconvolution method.

5. The system of claim 1, wherein said frame labels assigned to each of said plurality of speech frames are generated by comparing said plurality of speech frames to a model of said limited vocabulary.

6. The system of claim 5, wherein each said frame label identifies the most probable node of said HMM.

7. The system of claim 1, wherein said voice model is produced by pairing each of said plurality of frame labels to a sub-set of said plurality of processed frames.

8. The system of claim 1, which further includes:
    means for measuring a nearest neighbor distance between said voice model and a claimant voice model, said nearest neighbor distances calculated by comparing the individual frames of said voice model and said claimant voice model that have a corresponding frame label; and
    means for comparing said nearest neighbor distance with a predetermined threshold, wherein said comparing means is operative to produce a signal selected from the group consisting of an accept signal and a reject signal, wherein said reject signal is produced if said nearest neighbor distance exceeds said threshold and said accept signal is produced if said nearest neighbor distance is within said threshold.

9. The system of claim 1, which further includes:
    means for measuring a plurality of nearest neighbor distances between said voice model and a plurality of voice models, said nearest neighbor distances calculated by comparing the individual frames of said voice model and said plurality of voice model that have a corresponding label, said plurality of voice models including said voice model and an alternate voice model set;
    means for approximating a likelihood ratio from said plurality of nearest neighbor distances; and
    means for comparing said likelihood ratio with a predetermined threshold, wherein said comparing means is operative to produce a signal selected from the group consisting of an accept signal and a reject signal, wherein said reject signal is produced if said likelihood ratio exceeds said threshold and said accept signal is produced if said likelihood ratio is less than said threshold.

10. The system of claim 9, wherein said alternate voice model set is a single alternate voice model set utilized for a large group of enrolled users.

11. A method for verifying a voice of a user conducting a telephone transaction, comprising:
    prompting said user to speak in a limited vocabulary;
    converting said limited vocabulary into a plurality of speech frames;
    processing said plurality of speech frames to produce a plurality of processed frames, said processing including selecting those frames having power levels falling within a nominal range of acceptable energies which eliminates each of said plurality of speech frames which are below or exceed said nominal range, including those frames having an absence of words;

assigning a frame label to each of said plurality of speech frames to produce a plurality of frame labels; and combining said plurality of processed frames with said plurality of frame labels to produce a voice model including each of the plurality of frame labels that correspond to the number of said plurality of processed frames.

12. The method of claim 11, wherein said limited vocabulary includes at least one enrollment phrase selected from the group of 24 combinations of the words 4,6,7 & 9 that can be arranged in a double two-digit number combination.

13. The method of claim 11, wherein said model is a HMM model including a plurality of nodes.

14. The method of claim 11, wherein said processing further includes channel equalization of said plurality of speech frames by a blind deconvolution method.

15. The method of claim 11, wherein said frame label assigned to each of said plurality of speech frames is generated by comparing said plurality of speech frames to a model of said limited vocabulary.

16. The method of claim 15, wherein each said label identifies a most probable node of said HMM.

17. The method of claim 16, wherein said voice model is produced by pairing each of said plurality of frame labels to a sub-set of said plurality of processed frames.

18. The method of claim 11, which further includes:

measuring a nearest neighbor distance between said voice model and a claimant voice model, said nearest neighbor distance calculated by comparing the individual frames of said voice model and said claimant voice model that have a corresponding label; and comparing said nearest neighbor distance with a predetermined threshold in order to produce a signal selected from the group consisting of an accept signal and a reject signal, wherein said reject signal is produced if said nearest neighbor distance exceeds said threshold and said accept signal is produced if said nearest neighbor distance is within said threshold.

19. The method of claim 11, which further includes:

measuring a plurality of nearest neighbor distances between said voice model and a plurality of voice models, said nearest neighbor distances calculated by comparing the individual frames of said voice model and said plurality of voice model that have a corresponding label, said plurality of voice models including said voice model and an alternate voice model set;

producing a likelihood ratio from said plurality of nearest neighbor distances; and comparing said likelihood ratio with a predetermined threshold in order to produce a signal selected from the group consisting of an accept signal and a reject signal, wherein said reject signal is produced if said likelihood ratio exceeds said threshold and said accept signal is produced if said likelihood ratio is within said threshold.

20. The method of claim 19, wherein said alternate voice model set is a single alternate voice model set utilized for a large group of enrolled users.

21. The method of claim 20, wherein said alternate voice model set is formed by:

producing a number of voice models for a large number of users;

entering a first voice model from said number of voice models into said voice model set;

for each of the voice models, from said number of voice models, measuring nearest neighbor distances between another voice model from said number of voice models and each voice model in said alternate voice model set;

comparing said measured distances between the another voice model and each voice model in said alternate voice model set with a predetermined threshold; and adding said another voice model to said alternate voice model set only if all said measured distances associated with said another voice model exceed said predetermined threshold.

* * * * *